Figure 1:
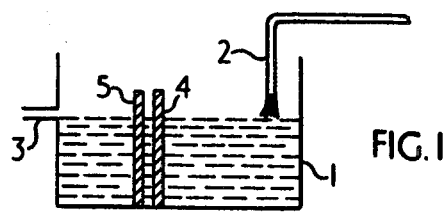

United States Patent

[11] 3,610,421

| [72] | Inventor | William A. Gurney<br>Birmingham, England |
|---|---|---|
| [21] | Appl. No. | 7,048 |
| [22] | Filed | Jan. 30, 1970 |
| [45] | Patented | Oct. 5, 1971 |
| [73] | Assignee | Dunlop Holdings Limited<br>London, England |
| [32] | Priority | Feb. 18, 1969 |
| [33] |  | Great Britain |
| [31] |  | 8661/69 |

[54] APPARATUS FOR SEPARATING IMMISCIBLE
LIQUIDS
10 Claims, 3 Drawing Figs.

[52] U.S. Cl. .................................................. 210/496,
210/510

[51] Int. Cl. ...................................................... B01d 17/02
[50] Field of Search ........................................... 210/65,
400, 402, 391, 359, 496, 510, 320

[56] References Cited
UNITED STATES PATENTS

| 3,426,902 | 2/1969 | Kilpert et al. ................. | 210/179 |
| 3,487,927 | 1/1970 | Yahnke ....................... | 210/400 |
| 3,016,345 | 1/1962 | Price ........................... | 210/510 X |

Primary Examiner—J. L. DeCesare
Attorney—Stevens, Davis, Miller & Mosher

ABSTRACT: An apparatus for separating immiscible liquids comprises; a liquid-separating zone, a cleaning zone and at least one porous metal or ceramic device. Said porous metal or ceramic device being movable between the two zones. In the separating zone the porous device serves to separate the immiscible liquids and in the cleaning zone the separated liquid is removed from the porous device. Also the method in which the above apparatus may be used.

PATENTED OCT 5 1971 3,610,421

William A. Gurney
Inventor

STEVENS. DAVIS MILLER & MOSHER
Attorneys

APPARATUS FOR SEPARATING IMMISCIBLE LIQUIDS

This invention relates to an apparatus and method for separating immiscible liquids, for example oil and water.

According to the present invention an apparatus for separating immiscible liquids comprises a liquid-separating zone and a cleaning zone, at least one porous metal or ceramic device, in the form of a three-dimensional network in which the metal or ceramic defines a plurality of cellular spaces which intercommunicate with one another, which is movable between the two zones whereby in the liquid-separating zone it serves to separate the immiscible liquids and in the cleaning zone the separated liquid is removed from the porous metal or ceramic device.

According to a further aspect of the present invention, a method for separating immiscible liquids comprises contacting the liquids with a porous metal or ceramic device in the form of a three-dimensional network in which the metal or ceramic defines a plurality of cellular spaces which intercommunicate with one another.

Preferably, the device comprises porous metal, for example, nickel, copper, iron or silver. The pore size is advantageously less than 20 pores per linear inch.

Separated liquid may be removed from the porous device by means of a solvent or by heating.

The porous metal may be produced by spraying, dipping or electrodeposition of the metal on a porous material. The porous material may be in the form of an agglomerate of fibers, such as a felted material, or a spongelike or foam material, such as natural sponge or a synthetic resinous foam. In general, polyurethane foams are preferred. The porous material may remain in the metal or it may be removed, e.g., by heating to melt or "ash-out" the material.

Where a high degree of porosity is required, the foam may be a reticulated foam, i.e., a foam in which the organic phase is a three-dimensional network with no substantial wall portions defining the cells. Such reticulated foams may be produced by removing the relatively thin cell walls from a foam, e.g., by chemical means such as aqueous sodium hydroxide in the case of polyurethane foams.

When the metal is to be electrodeposited it is, of course, necessary either to use a porous material which is electrically conducting or to render the material conducting by means of a conducting surface layer. Nonconductive materials may be made self-conducting by means of an additive such as graphite or a powdered metal. A conducting surface layer may be applied by coating the material with a curable resinous material incorporating a conductive additive or by chemically depositing a metal thereon, e.g., by the reduction of ammoniacal silver nitrate in situ. In general, where chemical deposition is employed the surface should be treated with one or more sensitizing agents such as stannous chloride followed by palladium chloride for silver.

Metals which can be electrodeposited include silver, copper, nickel and iron. Alloy foams can be produced in some cases by direct plating and in other cases two or more metals may be deposited successively and the alloy formed by heating the resultant structure. Steel foams can be produced by the incorporation of the required amounts of carbon and/or nitrogen. The carbon may be derived from organic material forming the basic foam or added to an electroplating bath.

The resulting alloy foams can, of course, be heat treated to give desirable physical properties, such heat treatments being well known in the art.

Alternatively, a porous ceramic material may be used. The ceramic may itself be in the form of a network or it may be in the form of a coating on a metal network. The production of such ceramic foams may be achieved by conventional means using a substrate in the form of a network.

A preferred method in accordance with the invention is hereinafter described by way of example.

A nickel foam having 80 pores per inch was produced by plating a reticulated polyurethane foam. 10 ml. of thick oil (SAE 140) were added to 200 ml. of water and mixed together so that coarse globules of the oil were dispersed throughout the water. The resulting mixture was poured on to the foam. It was found that the water readily passed through the foam and the oil remained in the foam.

The oil-laden foam was found to provide only small resistance to waterflow and yet it retained the oil when tap water was run through it. When the foam became saturated with oil it was cleaned by means of a suitable solvent.

The above experiment was repeated with a lighter oil (SAE 40) and similar results were obtained.

Figure 2:
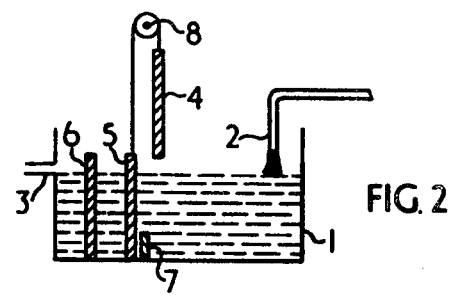
Figure 3:
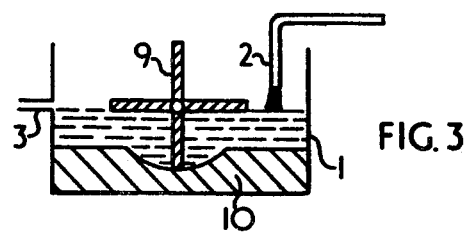

The method described in the above example may be carried out on a continuous basis using apparatus of the type illustrated, where:

FIG. 1 shows a simple apparatus according to the invention.
FIG. 2 shows a modification of apparatus shown in FIG. 1.
FIG. 3 shows an alternative apparatus.

The apparatus as shown in FIG. 1 comprises a tank 1 with inlet 2 and outlet 3. The oil/water mixture is introduced at inlet 2 and is allowed to flow through two plates 4 and 5 made of porous metal or ceramic material, oil free water emerges at outlet 3. The plates are arranged in pairs so that one at a time they may be withdrawn from the tank and the oil absorbed by them removed.

The apparatus shown in FIG. 2 is a modification of that shown in FIG. 1. The two plates 4 and 5 are connected to reciprocating mechanism 8 so that they are alternately withdrawn and introduced in the flow of the water/oil mixture. The weir 7 is provided to prevent liquid flowing under the plates 4 and 5 while change over is occurring. A porous plate 6 is provided to trap any oil that may escape during the change over of plates 4 and 5. An alternative modification would be to replace porous plates 4 and 5 by an endless band of the porous material.

While in the above apparatuses the oil/water dispersion was made to pass through the foam, it will be appreciated that similar effects can be achieved by moving the foam relative to the dispersion.

FIG. 3 shows an alternative arrangement of the apparatus where the porous metal or ceramic plates are mounted on a rotatable spindle and are radially distributed with respect thereto. The spindle being rotated so that the porous plates sweep through the oil/water mixture in the opposite direction to the flow of liquid. It is preferred in this apparatus to have a shaped bottom 10 to the tank so that the oil/water mixture cannot pass under the porous plates. The porous plates are cleaned while they are clear of the oil/water mixture.

It will be apparent that the apparatus and method of this invention are extremely convenient for separating oil from water. The foam is a rigid robust structure which is able to withstand the effects of cleansing solvents and yet it offers very little resistance to waterflow. The apparatus and method are expected to find application in a wide variety of separation problems such as oil pollution of, for example, sea water.

If desired, the foam metal may be coated with a water repellent so that it will float. In this case the foam may be used for scavenging.

Having now described our invention, what we claim is:

1. An apparatus for separating immiscible liquids comprising a liquid-separating zone and a cleaning zone, at least one rigid porous metal device, in the form of a three-dimensional network in which the metal defines a plurality of cellular spaces which intercommunicate with one another, means for moving said device between the two zones whereby in the liquid-separating zone it serves to separate the immiscible liquids and in the cleaning zone the separated liquid is removed from the porous metal device.

2. An apparatus according to claim 1 in which the porous metal device is formed by depositing the metal on a porous material.

3. An apparatus according to claim 2 in which the porous material is a reticulated foam.

4. An apparatus according to claim 3 in which the reticulated foam is a reticulated polyurethane foam.

5. An apparatus according to claim 2 in which the metal is deposited on the porous material by electrodeposition.

6. An apparatus according to claim 1 in which the porous device has more than 20 pores per linear inch.

7. An apparatus according to claim 1 in which the separated liquid is removed from the porous device by means of washing with solvent.

8. An apparatus according to claim 1 in which the separated liquid is removed from the porous device by heating.

9. An apparatus according to claim 1 comprising a plurality of porous metal devices.

10. An apparatus according to claim 9 in which the porous metal devices are mounted on a rotatable spindle and are radially distributed with respect thereto.